US009236595B2

(12) United States Patent
Lee et al.

(10) Patent No.: US 9,236,595 B2
(45) Date of Patent: Jan. 12, 2016

(54) SECONDARY BATTERY (75) Inventors: Chi-Young Lee, Suwon-si (KR);
Sang-Eun Cheon, Suwon-si (KR);
Seok-Yoon Yoo, Suwon-si (KR);
Yoon-Tai Kwak, Suwon-si (KR);
Dong-Wook Kim, Suwon-si (KR);
Jong-Seok Moon, Suwon-si (KR);
Sang-Dae Hwang, Suwon-si (KR);
Tatsuya Hashimoto, Suwon-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 991 days.

(21) Appl. No.: 12/801,796

(22) Filed: Jun. 25, 2010

(65) Prior Publication Data
US 2011/0151318 A1 Jun. 23, 2011

(30) Foreign Application Priority Data
Dec. 18, 2009 (KR) .................. 10-2009-0126922

(51) Int. Cl.
*H01M 2/26* (2006.01)
*H01M 10/04* (2006.01)
*H01M 10/052* (2010.01)

(52) U.S. Cl.
CPC .............. *H01M 2/263* (2013.01); *H01M 2/266* (2013.01); *H01M 10/0431* (2013.01); *H01M 10/052* (2013.01)

(58) Field of Classification Search
None
See application file for complete search history.

(56) References Cited

U.S. PATENT DOCUMENTS

| 6,106,975 | A | * | 8/2000 | Watanabe et al. | 429/211 |
| 2005/0287431 | A1 | * | 12/2005 | Cho | 429/161 |
| 2006/0093910 | A1 | | 5/2006 | Yoon et al. | |
| 2007/0009792 | A1 | | 1/2007 | Cheon et al. | |

FOREIGN PATENT DOCUMENTS

| JP | 59-132559 A | 7/1984 | |
| JP | 2001-126708 A | 5/2001 | |
| JP | 2005-142026 A | 6/2005 | |
| JP | 2008-166030 A | 7/2008 | |
| KR | 1998-0058653 | * 10/1998 | .............. H01M 4/02 |
| KR | 1998-0058653 A | 10/1998 | |
| KR | 10 2006-0037594 A | 5/2006 | |
| KR | 10-2008-0095612 A | 10/2008 | |
| KR | 10 2010-0008854 A | 1/2010 | |

OTHER PUBLICATIONS

Korean Notice of Allowance in KR 10-2009-0126922, dated Mar. 26, 2012 (Lee, et al.).
European Search Report in EP 10175943.9-1227, dated Nov. 26, 2010 (Lee, et al.).

* cited by examiner

*Primary Examiner* — Yoshitoshi Takeuchi
(74) *Attorney, Agent, or Firm* — Lee & Morse, P.C.

(57) ABSTRACT

A secondary battery including an electrode assembly, the electrode assembly including electrode plates and a separator interposed between the electrode plates, at least one of the electrode plates including a coated part, the coated part including a metallic plate having an active material coated thereon, and an uncoated part, the uncoated part including a metallic plate without active material coated thereon, the uncoated part including a folding line in the uncoated part, and a folding part with an end portion folded with respect to the folding line; and a current collector electrically contacting the folding part.

7 Claims, 12 Drawing Sheets

FIG. 15

SECONDARY BATTERY

BACKGROUND

1. Field

Embodiments relate to a secondary battery.

2. Description of the Related Art

Unlike primary batteries that are not rechargeable, secondary batteries are rechargeable. Secondary batteries are widely used in high-technology electronic devices, e.g., cellular phones, notebook computers, and camcorders. Secondary batteries may also be used in cars.

A secondary battery may include an electrode assembly and an electrolyte. The electrode assembly may include a positive electrode plate, a negative electrode plate, and a separator. In many cases, the electrolyte includes lithium (Li) ions. The positive and negative electrode plates of the electrode assembly may each include electrode tabs protruding out of the electrode assembly.

The electrode assembly may be accommodated in a case. Electrode terminals may extend to be exposed outside the case. The electrode tabs may protrude out of the electrode assembly and may be electrically connected to the electrode terminals. The case may have, e.g., a cylindrical shape or a rectangular shape.

The positive and negative electrode plate may each include coated parts and uncoated parts. The coated parts may include a portion of the electrode in which an active material is coated on a metallic current collector. The uncoated parts may include portions of the electrode in which an active material is not coated on the metallic current collector. The uncoated parts may be electrically connected to current collectors and the current collectors may be electrically connected to the electrode terminals protruding out of the case. Thus, the electrode assembly may be electrically connected to the outside of the secondary battery.

SUMMARY

Embodiments are directed to a secondary battery, which represents advances over the related art.

It is a feature of an embodiment to provide a secondary battery capable of improving performance by improving electrical contact between current collectors and uncoated parts of an electrode assembly.

At least one of the above and other features and advantages may be realized by providing a secondary battery including an electrode assembly, the electrode assembly including electrode plates and a separator interposed between the electrode plates, at least one of the electrode plates including a coated part, the coated part including a metallic plate having an active material coated thereon, and an uncoated part, the uncoated part including a metallic plate without active material coated thereon, the uncoated part including a folding line in the uncoated part, and a folding part with an end portion folded with respect to the folding line; and a current collector electrically contacting the folding part.

The secondary battery may further include supporting elements, the supporting elements penetrating the uncoated part along the folding line, and supporting the folding part folded with respect to the folding line.

The folding line may include a plurality of penetration holes perforating the uncoated part.

The secondary battery may further include supporting bars, the supporting bars being disposed in the penetration holes, and supporting the folding part folded with respect to the folding line.

The folding line may include a penetration slit in the uncoated part.

The secondary battery may further include a supporting plate, the supporting plate being disposed in the penetration slit, and supporting the folding part to be folded with respect to the folding line.

The electrode assembly may have a plate shape formed by winding the electrode plates and the separator in a jelly roll configuration and then pressing the wound electrode assembly.

The electrode assembly may include a flat part where an outer circumference of the electrode assembly is flat; and curved parts where the outer circumference of the electrode assembly is curved, the curved parts being disposed at both ends of the flat part.

The folding line may be disposed in the flat part.

The secondary battery may further include a case, the case having an open end, and being configured to accommodate the electrode assembly; and a cap plate, the cap plate being coupled to the open end of the case, and being configured to seal the electrode assembly in the case.

The electrode plates may include first and second electrode plates separated by the separator, and the current collector may include first and second current collectors electrically connected to the first and second electrode plates, respectively.

The secondary battery may further include a first electrode terminal, the first electrode terminal being electrically connected to the first current collector, and partially protruding out of the case through the cap plate.

The secondary battery may further include a second electrode terminal, the second electrode terminal being electrically connected to the second current collector, and partially protruding out of the case through the cap plate.

The folding line may extend in one direction in the form of a straight continuous line, a discontinuous dotted line, or a discontinuous dashed line.

At least one of the above and other features and advantages may also be realized by providing a secondary battery including an electrode assembly, the electrode assembly including electrode plates and a separator interposed between the electrode plates, at least one of the electrode plates including a coated part, the coated part including a metallic plate having an active material coated thereon, and an uncoated part, the uncoated part including a metallic plate without active material coated thereon, the uncoated part including a folding groove in the uncoated part, the folding groove extending in one direction, and a folding part with an end portion folded with respect to the folding line; and a current collector electrically contacting the folding part.

The electrode assembly may have a plate shape formed by winding the electrode plates and the separator in a jelly roll configuration and then pressing the wound electrode assembly.

The electrode assembly may include a flat part where an outer circumference of the electrode assembly is flat; and curved parts where the outer circumference of the electrode assembly is curved, the curved parts being disposed at both ends of the flat part.

The folding part may be folded with respect to the folding groove in a direction of the flat part.

The electrode plates may include first and second electrode plates separated by the separator, and the current collector may include first and second current collectors electrically connected to the first and second electrode plates, respectively.

The folding groove may extend in the one direction in the form of a straight continuous line, a discontinuous dotted line, or a discontinuous dashed line.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0126922, filed on Dec. 18, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, or one or more intervening elements may also be present. In addition, it will also be understood that when an element is referred to as being "between" two elements, it can be the only element between the two elements, or one or more intervening elements may also be present. Like reference numerals refer to like elements throughout.

The present embodiments may have different forms and should not be construed as being limited to the descriptions set forth herein. Accordingly, the embodiments are merely described below, by referring to the figures, to explain aspects of the present description.

Figure 1:
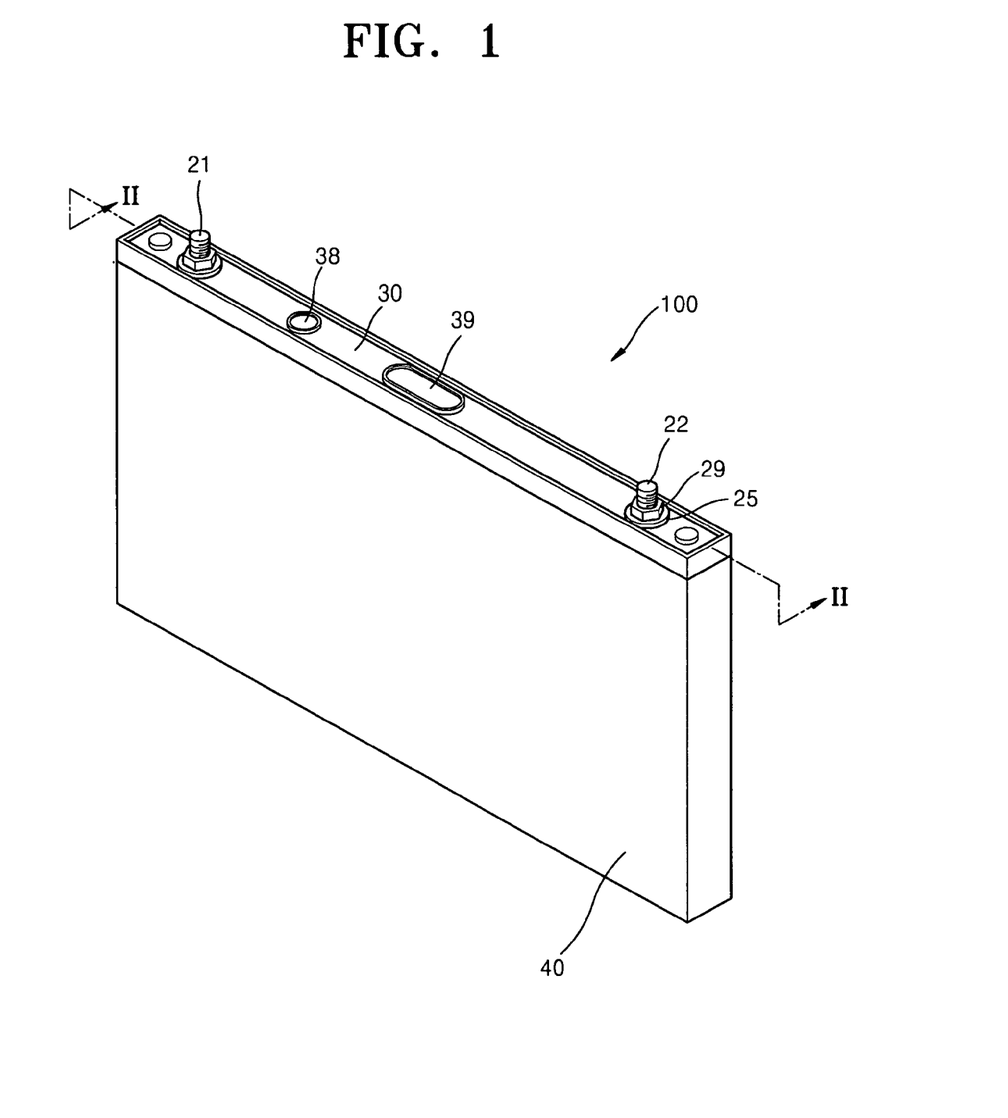
FIG. 1 illustrates a perspective view of a secondary battery according to an embodiment.
Figure 2:
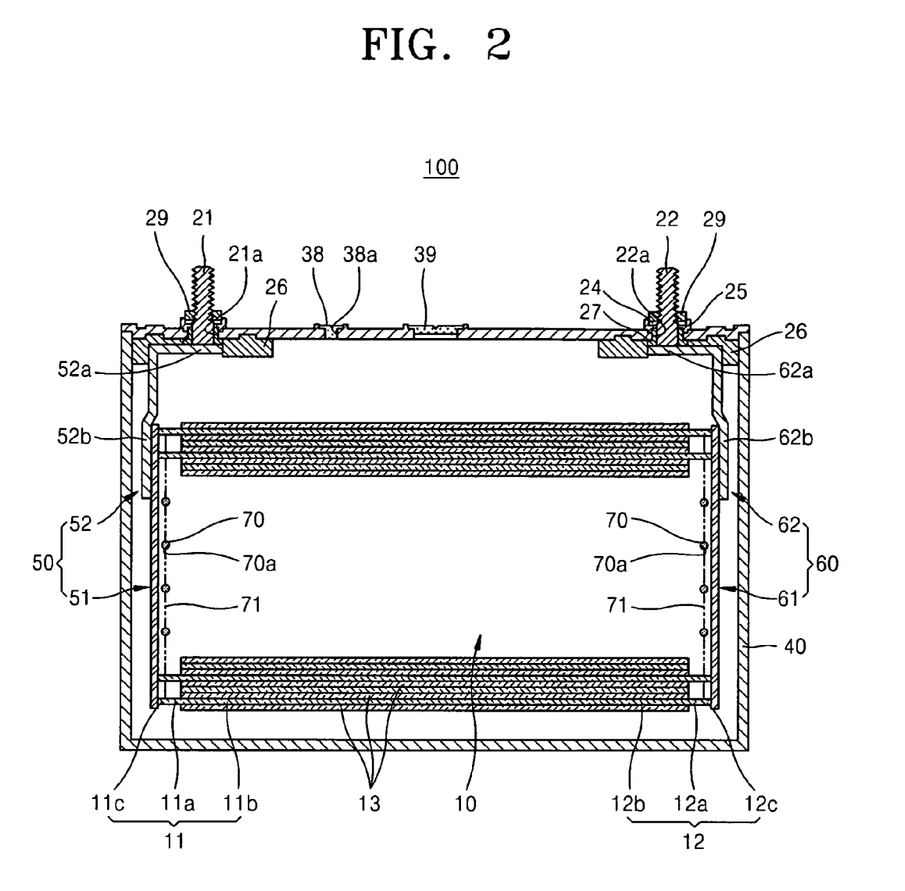
FIG. 2 illustrates a cross-sectional view taken along a line II-II of FIG. 1.

FIG. 1 illustrates a perspective view of a secondary battery 100 according to an embodiment. FIG. 2 illustrates a cross-sectional view taken along a line II-II of FIG. 1.

Referring to FIGS. 1 and 2, the secondary battery 100 may include an electrode assembly 10, first and second electrode terminals 21 and 22, a cap plate 30, a case 40, first and second current collectors 50 and 60, and first and second folding parts 11c and 12c. In an implementation, the secondary battery 100 may be a lithium (Li)-ion secondary battery and may have a rectangular shape.

The electrode assembly 10 may include first and second electrode plates 11 and 12 respectively including first and second coated parts 11b and 12b and first and second uncoated parts 11a and 12a. The first and second coated parts 11b and 12b may include a metallic current collector having an active material coated thereon. The first and second uncoated parts 11a and 12a may include the metallic current collector without active material coated thereon. A separator 13 may be interposed between the first and second electrode plates 11 and 12. Penetration holes 70a may penetrate the first and second uncoated parts 11a and 12a. A plurality of the penetration holes 70a may form a folding line 71.

The first and second current collectors 50 and 60 may electrically contact the first and second uncoated parts 11a and 12a. The first and second folding parts 11c and 12c may be formed by folding ends of the first and second uncoated parts 11a and 12a with respect to the folding line 71. Thus, the first and second folding parts 11c and 12c may electrically contact the first and second current collectors 50 and 60.

The first and second folding parts 11c and 12c may be formed by folding portions of the respective first and second uncoated parts 11a and 12a with respect to, e.g., virtual, folding lines 71 formed by, i.e., defined by, the penetration holes 70a. The first and second folding parts 11c and 12c may electrically contact the first and second current collectors 50 and 60. The first and second folding parts 11c and 12c may advantageously increase an area of respective electrode plates 11 and 12 contacting the first and second current collectors 50 and 60.

Accordingly, because of the increased contact area, electrical contact between the first and second uncoated parts 11a and 12a of the electrode assembly 10 and the first and second current collectors 50 and 60 may be improved. Also, the first and second uncoated parts 11a and 12a of the electrode assembly 10 may be uniformly formed.

The secondary battery 100 may further include supporting bars 70 inserted into the penetration holes 70a to support the first and second folding parts 11c and 12c folded with respect to the penetration holes 70a. In an implementation, the folding lines 71 may be, e.g., virtual, lines connecting the supporting bars 70.

The first and second folding parts 11c and 12c may be formed by inserting the supporting bars 70 into the penetration holes 70a and folding ends of the first and second uncoated parts 11a and 12a along the folding lines 71 defined by the supporting bars 70. Accordingly, the first and second folding parts 11c and 12c may be formed more uniformly and more easily with the support of the supporting bars 70.

The electrode assembly 10 may sequentially include the first electrode plate 11, the separator 13, and the second electrode plate 12. In this case, the first and second electrode plates 11 and 12 may be separated by the separator 13. The first and second current collectors 50 and 60 may electrically contact the electrode assembly 10. In particular, the first and second current collectors 50 and 60 may electrically contact the first and second electrode plates 11 and 12, respectively. The cap plate 30 may be coupled to an opening of the case 40 so as to seal the case 40 in which the electrode assembly 10 is accommodated.

The electrode assembly 10 may be formed by winding the first electrode plate 11, the separator 13 and the second electrode plate 12 in a jelly roll configuration. However, the embodiments are not limited thereto; and the electrode assembly 10 may be formed by, e.g., alternately stacking the first electrode plate 11, the separator 13, and the second electrode plate 12.

The first current collector 50 may contact a portion of the first electrode plate 11 that protrudes from one end of the electrode assembly 10. The second current collector 60 may contact a portion of the second electrode plate 12 that protrudes from another, i.e., opposite, end of the electrode assembly 10.

The first electrode terminal 21 may be electrically connected to the first current collector 50 and may be partially exposed outside the case 40 through the cap plate 30. The second electrode terminal 22 may be electrically connected to the second current collector 60 and may also be partially exposed outside the case 40 through the cap plate 30.

In the secondary battery 100, the first electrode plate 11 may be a positive electrode plate and the second electrode plate 12 may be a negative electrode plate. Also, the first current collector 50 may be a positive electrode current collector and the second current collector 60 may be a negative electrode current collector. Furthermore, the first electrode terminal 21 may be a positive electrode terminal and the second electrode terminal 22 may be a negative electrode terminal. However, the embodiments are not limited thereto; and polarities of the electrodes may be reversed depending upon a charging or discharging state of the secondary battery 100.

The electrode assembly 10 may be wound by interposing the separator 13, i.e., an insulator, between the first and second electrode plates 11 and 12. The case 40 may accommodate the electrode assembly 10. The first and second electrode terminals 21 and 22 may respectively be positive and negative electrode terminals. The first and second electrode terminals 21 and 22 may be respectively electrically connected to the first and second electrode plates 11 and 12 of the electrode assembly 10 and may protrude out of the case 40. The cap plate 30 may be coupled to the opening of the case 40.

The first and second electrode plates 11 and 12 may respectively include the first and second uncoated parts 11a and 12a and the first and second coated parts 11b and 12b. The first and second uncoated parts 11a and 12a may be portions of the respective electrode plates 11 and 12 in which an active material is not coated on the current collector formed of thin metal foil. The first and second coated parts 11b and 12b may be portions in which an active material is coated on a current collector formed of thin metal foil.

The first uncoated part 11a may be disposed at one end of the first electrode plate 11 in a lengthwise direction thereof. The second uncoated part 12a may be disposed at another, i.e., opposite, end of the second electrode plate 12 in a lengthwise direction thereof.

Figure 3:
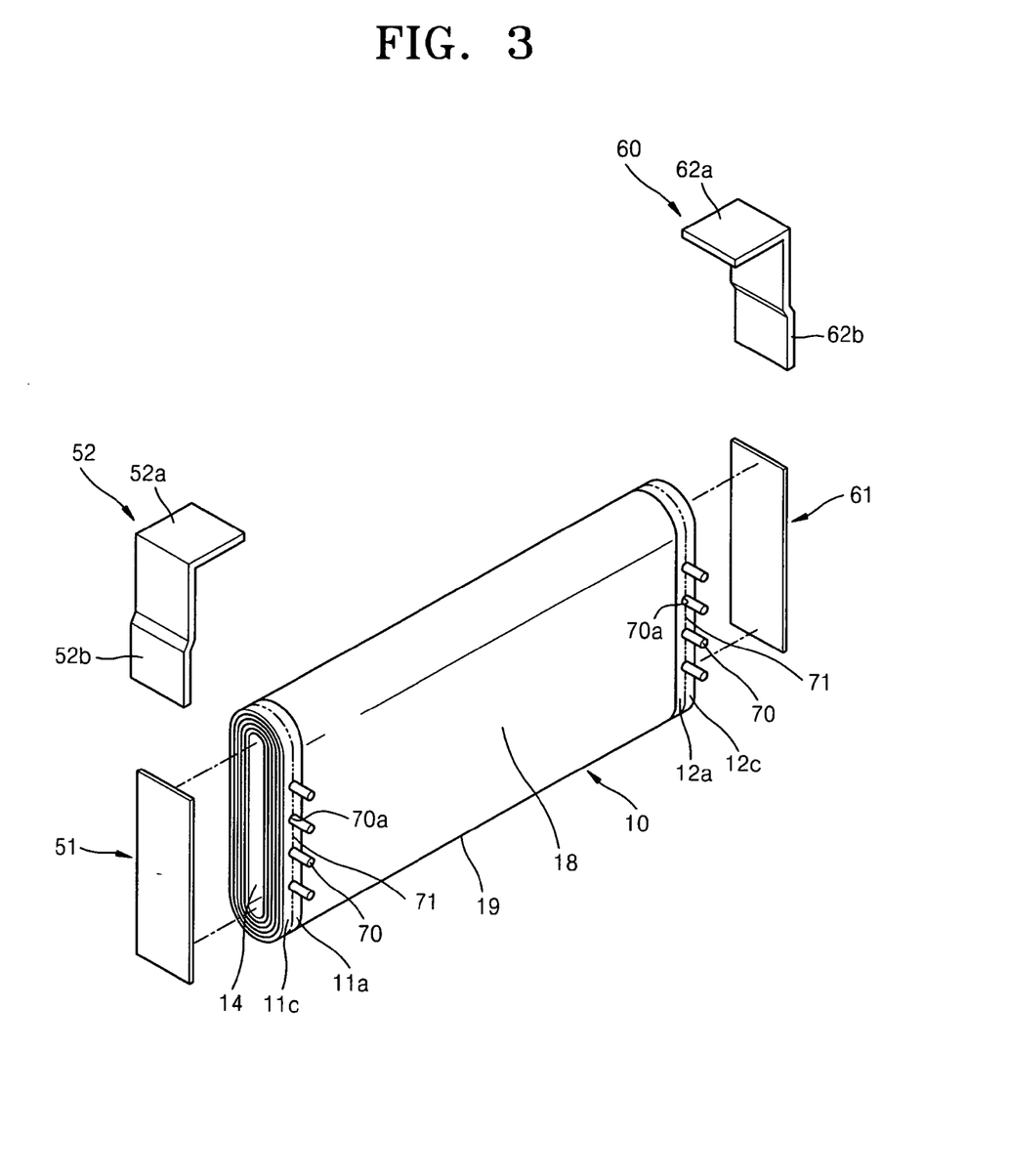
FIG. 3 illustrates a partially exploded perspective view of an electrode assembly and first and second current collectors of the secondary battery of FIG. 1.

FIG. 3 illustrates a partially exploded perspective view of the electrode assembly 10 and the first and second current collectors 50 and 60 of the secondary battery 100 of FIG. 1.

Referring to FIG. 3, the electrode assembly 10 may include a plurality of penetration holes 70a and supporting bars 70. The penetration holes 70a may form, i.e., may define, the folding line 71; and the supporting bars 70 may function as supporting elements by being inserted into the penetration holes 70a. The supporting bars 70 may support the first and second folding parts 11c and 12c folded with respect to the penetration holes 70a.

The penetration holes 70a may include a plurality of holes that perforate the first and second uncoated parts 11a and 12a.

The penetration holes 70a may be formed in the first and second uncoated parts 11a and 12a by using, e.g., a laser. In an implementation, the penetration holes 70a may be formed in the first and second uncoated parts 11a and 12a of the jelly roll-type electrode assembly 10.

The first and second folding parts 11c and 12c may be formed by folding portions of the first and second uncoated parts 11a and 12a with respect to the virtual folding lines 71 formed, i.e., defined, by the penetration holes 70a. The first and second folding parts 11c and 12c may electrically contact the first and second current collectors 50 and 60, respectively. The first and second folding parts 11c and 12c may increase an area of the respective electrode plates 11 and 12 contacting the first and second current collectors 50 and 60.

Accordingly, due to the increased contact area, electrical contact between the first and second uncoated parts 11a and 12a of the electrode assembly 10 and the first and second current collectors 50 and 60 may be improved. Also, the first and second uncoated parts 11a and 12a of the electrode assembly 10 may be uniformly formed.

The electrode assembly 10 may be formed by circularly winding and then pressing the first electrode plate 11, the separator 13, and the second electrode plate 12. Thus, the electrode assembly 10 may be pressed to have a plate shape including flat parts 18 and curved parts 19, as illustrated in FIG. 3.

The flat parts 18 may be portions of the electrode assembly 10 where an outer circumference thereof is flat. The curved parts 19 may be portions of the electrode assembly 10 where the outer circumference thereof is curved. The curved parts 19 may be disposed at both ends of the flat parts 18.

Figure 4:
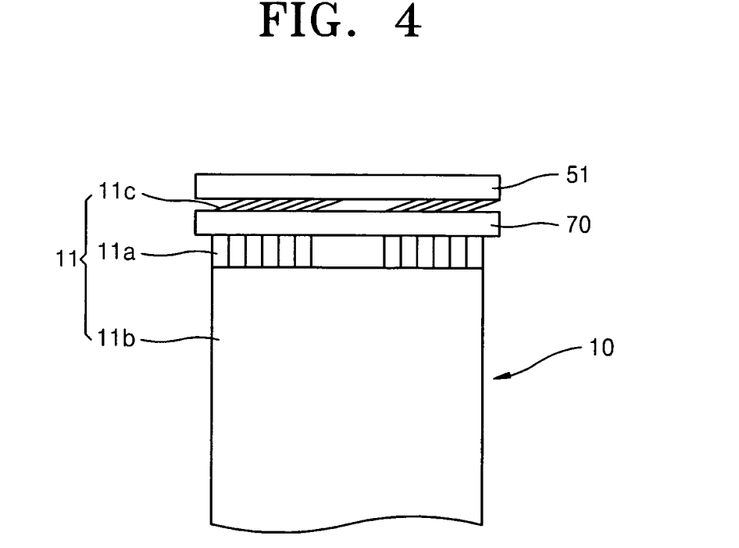
FIG. 4 illustrates a diagram showing a first folded part of an electrode assembly contacting a first current collecting plate in the secondary battery of FIG. 1.

The penetration holes 70a may be formed in the flat parts 18. FIG. 4 illustrates a diagram showing the first folding part 11c of the electrode assembly 10 contacting a first current collecting plate 51 of the first current collector 50 in the secondary battery 100 of FIG. 1. The structure of FIG. 4 may also be applied when the second folding part 12c contacts a second current collecting plate 61 of the second current collector 60.

Referring back to FIGS. 1 and 2, the case 40 may have a rectangular can shape having an open end. The electrode assembly 10 may be accommodated in the case 40 together with an electrolyte through the open end of the case 40. The cap plate 30 may allow the first and second electrode terminals 21 and 22 to protrude out of the case 40 and may cover the case 40. The cap plate 30 may be, e.g., welded, to the open end of the case 40 so as to seal the case 40.

The cap plate 30 may be formed as a thin plate. An electrolyte inlet 38a, through which the electrolyte may be injected, may be formed in the cap plate 30. A sealing cap 38 may be fitted in the electrolyte inlet 38a. Also, the cap plate 30 may include a vent element 39 in which a groove may be broken if a predetermined internal pressure is reached.

First and second terminal holes 21a and 22a may perforate the cap plate 30. The first and second terminal holes 21a and 22a may respectively be positive and negative electrode terminal holes. The first electrode terminal 21 may protrude out of the case 40 through the first terminal hole 21a. The second electrode terminal 22 may protrude out of the case 40 through the second terminal hole 22a.

Upper and lower gaskets 25 and 27 may be interposed between the cap plate 30 and the first and second electrode terminals 21 and 22, respectively. The upper and lower gaskets 25 and 27 may insulate the cap plate 30 from the first and second electrode terminals 21 and 22, respectively. The first and second electrode terminals 21 and 22 may respectively be positive and negative electrode terminals.

The lower gaskets 27 may be fixed in the first and second terminal holes 21a and 22a and under the cap plate 30. The upper gaskets 25 may be fixed on the cap plate 30. Washers 24 for buffering a combining force may be disposed on the upper gaskets 25. Threads may be formed on the first and second electrode terminals 21 and 22 and may be coupled to nuts 29. The nuts 29 may support the first and second electrode terminals 21 and 22 on the case 40.

However, the embodiments are not limited thereto; and the first and second electrode terminals 21 and 22 may have, e.g., a rivet-type configuration. In such a case, the first and second electrode terminals 21 and 22 may be fixed to the cap plate 30 by protruding portions of the first and second electrode terminals 21 and 22 out of the case 40 through the first and second terminal holes 21a and 22a. Then, the upper gaskets 25 may be interposed between the first and second terminal holes 21a and 22a and the protruding portions of the first and second electrode terminals 21 and 22. Then, the protruding portions of the first and second electrode terminals 21 and 22 may be pressed.

The first current collector 50 may include the first current collecting plate 51 and a first lead element 52. The second current collector 60 may include the second current collecting plate 61 and a second lead element 62. The first and second current collecting plates 51 and 61 may respectively be positive and negative electrode current collecting plates; and the first and second lead elements 52 and 62 may respectively be positive and negative electrode lead elements.

The first current collecting plate 51 may be coupled to the first folding part 11c of the electrode assembly 10 by using, e.g., a laser or ultrasonic welding method. The first current collecting plate 51 may be electrically connected to the first electrode terminal 21 via the first lead element 52. Thus, the first electrode terminal 21 may be connected to the first electrode plate 11 of the electrode assembly 10 via the first lead element 52 and the first current collecting plate 51.

Also, the second current collecting plate 61 may be bonded to the second folding part 12c of the electrode assembly 10 by using, e.g., a laser or ultrasonic welding method. The second current collecting plate 61 may be electrically connected to the second electrode terminal 22 via the second lead element 62. Thus, the second electrode terminal 22 may be connected to the second electrode plate 12 of the electrode assembly 10 via the second lead element 62 and the second current collecting plate 61.

Insulating elements 26 may be disposed between the cap plate 30 and the first and second lead elements 52 and 62. The first and second lead elements 52 and 62 may respectively include first and second terminal lead elements 52a and 62a and first and second current collector lead elements 52b and 62b. The first and second terminal lead elements 52a and 62a may be coupled to and electrically contact the first and second electrode terminals 21 and 22. The first and second current collector lead elements 52b and 62b may be coupled to and electrically contact the first and second current collecting plates 51 and 61.

In an implementation, with respect to one of the first and second electrode terminals 21 and 22, the upper gasket 25, the insulating element 26, and the lower gasket 27 for electrically separating the first electrode plate 11 or the second electrode plate 12 from the cap plate 30 may not be included.

For example, the upper gasket 25 and the lower gasket 27 may not be included between the first electrode terminal 21 and the cap plate 30; and the insulating element 26 may not be included between the cap plate 30 and the first lead element 52 connected to the first electrode terminal 21.

In this case, the first electrode terminal 21 may directly contact the cap plate 30 through the first terminal hole 21a without the upper gasket 25 and the lower gasket 27. Also, the first lead element 52 may directly contact the cap plate 30. Thus, the cap plate 30 and the case 40 have the same polarity as the first electrode terminal 21.

The secondary battery 100 may be, e.g., a Li-ion secondary battery. However, the embodiments are not limited thereto; and, in addition to the Li-ion secondary battery, the secondary battery 100 may include various other secondary batteries, e.g., a nickel (Ni)-cadmium (Cd) secondary battery, a Ni-hydrogen (H) secondary battery, and/or a Li secondary battery.

The secondary battery 100 may be a rectangular battery as illustrated in FIGS. 1 and 2. However, the embodiments are not limited thereto; and the secondary battery 100 may include various other batteries, e.g., a cylindrical battery and/or a pouch battery.

According to the present embodiment, performance of the secondary battery 100 may be improved by improving electrical contact between the first and second current collectors 50 and 60 and the first and second uncoated parts 11a and 12a of the electrode assembly 10, respectively.

Figure 5:
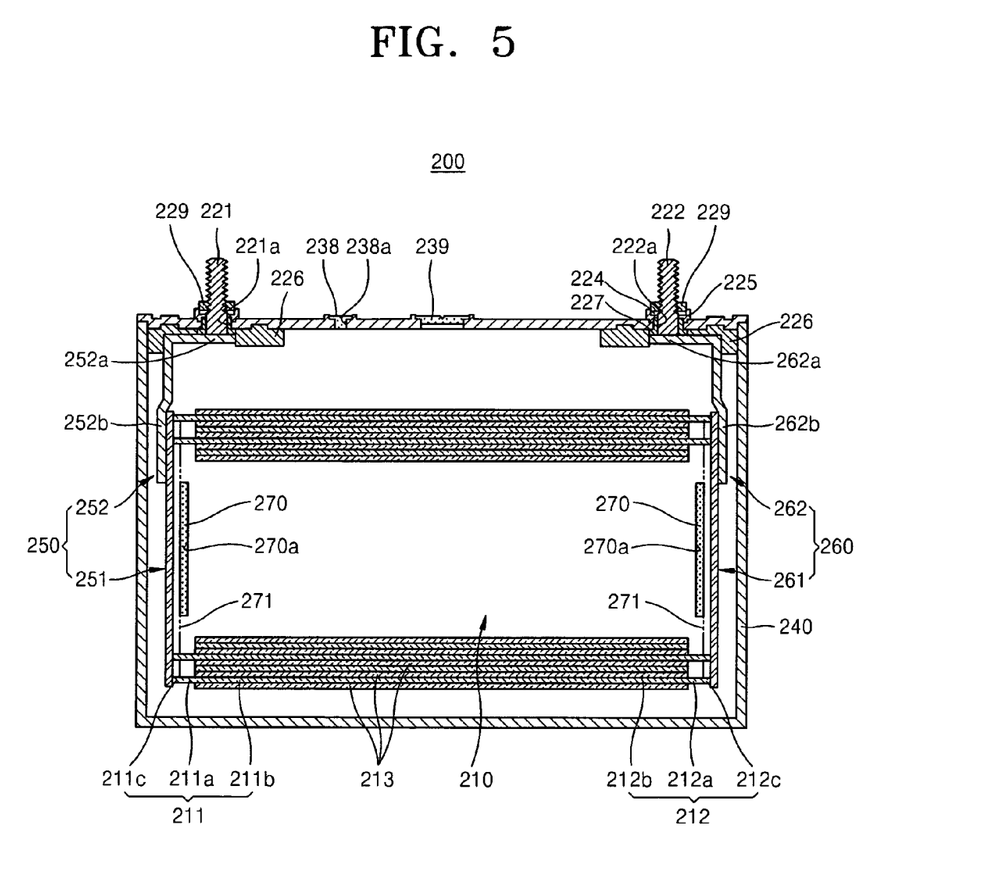
FIG. 5 illustrates a cross-sectional view of a secondary battery according to another embodiment.
Figure 6:
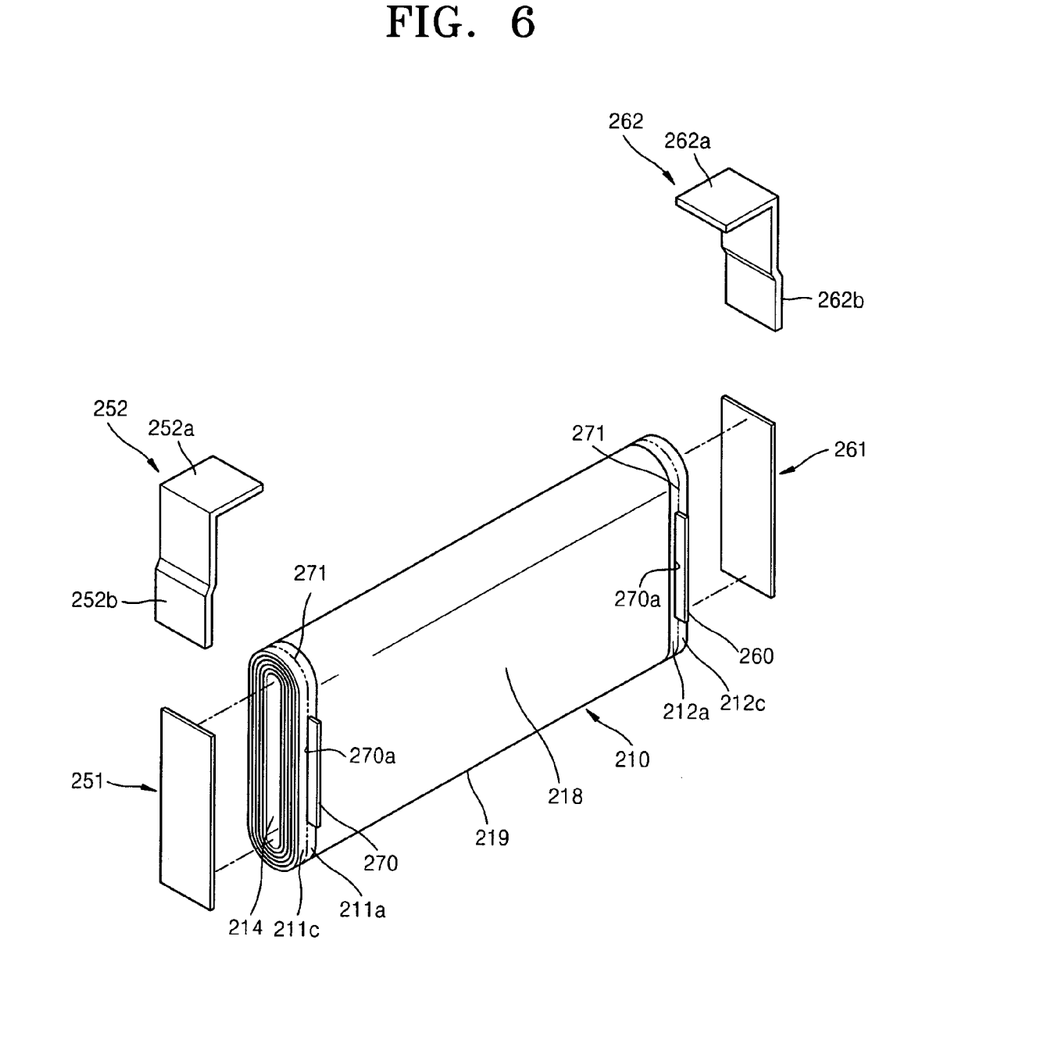
FIG. 6 illustrates a partially exploded perspective view of an electrode assembly and first and second current collectors of the secondary battery of FIG. 5.

FIG. 5 illustrates a cross-sectional view of a secondary battery 200 according to another embodiment. FIG. 6 illustrates a partially exploded perspective view of an electrode assembly 210 and first and second current collectors 250 and 260 of the secondary battery 200 of FIG. 5.

Compared to the secondary battery 100 of FIG. 2, in the secondary battery 200 of the present embodiment, penetration slits 270a may form, i.e., may define, folding lines 271; and supporting plates 270 may be included as supporting elements.

Similar reference numerals are used to denote like elements in FIGS. 2 and 5 and repeated description thereof is omitted.

Referring to FIGS. 5 and 6, the secondary battery 200 may include the electrode assembly 210, first and second electrode terminals 221 and 222, a cap plate 230, a case 240, the first and second current collectors 250 and 260, and first and second folding parts 211c and 212c.

The electrode assembly 210 may include first and second electrode plates 211 and 212. The first and second electrode plates 211 and 212 may respectively include first and second coated parts 211b and 212b and first and second uncoated parts 211a and 212a. The first and second coated parts 211b and 212b may include a metallic current collector having an active material coated thereon. The first and second uncoated parts 211a and 212a may include a metallic current collector without active material coated thereon. A separator 213 may be interposed between the first and second electrode plates 211 and 212. The penetration slits 270a may be disposed in the first and second uncoated parts 211a and 212a.

The first and second current collectors 250 and 260 may electrically contact the first and second uncoated parts 211a and 212a. The first and second folding parts 211c and 212c may be formed by folding ends of the first and second uncoated parts 211a and 212a with respect to the penetration slits 270a. Thus, the first and second folding parts 211c and 212c may electrically contact the first and second current collectors 250 and 260.

The first and second folding parts 211c and 212c may be formed by folding portions of the first and second uncoated parts 211a and 212a with respect to virtual folding lines 271 formed by, i.e., defined by, the penetration slits 270a. Thus, the first and second folding parts 211c and 212c may electrically contact the first and second current collectors 250 and 260. The first and second folding parts 211c and 212c may increase an area of the electrode plates 11 and 12 contacting the first and second current collectors 250 and 260, respectively.

Accordingly, due to the increased contact area, electrical contact between the first and second uncoated parts 211a and 212a of the electrode assembly 210 and the first and second current collectors 250 and 260 may be improved. Also, the first and second uncoated parts 211a and 212a of the electrode assembly 210 may be uniformly formed.

In this case, the secondary battery 200 may further include the supporting plates 270 inserted into the penetration slits 270a and supporting the first and second folding parts 211c and 212c folded with respect to the penetration slits 270a. The folding lines 271 may be virtual lines extending along end portions of the first and second uncoated parts 211a and 212a from the supporting plates 270 in the penetration slits 270a.

The first and second folding parts 211c and 212c may be formed by inserting the supporting plates 270 into the penetration slits 270a and folding the ends of the first and second uncoated parts 211a and 212a along the folding lines 271 formed by, i.e., defined by, the supporting plates 270. Accordingly, the first and second folding parts 211c and 212c may be formed more uniformly and more easily with support from the supporting plates 270.

The electrode assembly 210 may sequentially include the first electrode plate 211, the separator 213, and the second electrode plate 212. The first and second electrode plates 211 and 212 may be separated by the separator 213. The first and second current collectors 250 and 260 may electrically contact the electrode assembly 210. In particular, the first and second current collectors 250 and 260 may electrically contact the first and second electrode plates 211 and 212, respectively. The cap plate 230 may be coupled to an opening of the case 240 so as to seal the case 240 in which the electrode assembly 210 is accommodated.

The electrode assembly 210 may be wound by interposing the separator 213, i.e., an insulator, between the first and second electrode plates 211 and 212. The case 240 may accommodate the electrode assembly 210. The first and second electrode terminals 221 and 222 may respectively be positive and negative electrode terminals; and the first and second electrode plates 211 and 212 may respectively be positive and negative electrode plates.

The first and second electrode terminals 221 and 222 may be respectively electrically connected to the first and second electrode plates 211 and 212 of the electrode assembly 210 and may protrude out of the case 240. The cap plate 230 may be coupled to the opening of the case 240. The first and second current collectors 250 and 260 may respectively be positive and negative electrode current collectors. The first and second current collectors 250 and 260 may respectively electrically contact the first and second electrode plates 211 and 212.

The first electrode plate 211 may include the first uncoated part 211a and the first coated part 211b. The second electrode plate 212 may include the second uncoated part 212a and the second coated part 212b. The first electrode terminal 221 may protrude out of the case 240 through a first terminal hole 221a. The second electrode terminal 222 may protrude out of the case 240 through a second terminal hole 222a.

An electrolyte inlet 238a may be formed in the cap plate 230. A sealing cap 238 may be fitted in the electrolyte inlet 238a. A vent element 239 may be disposed in the cap plate 230. Upper and lower gaskets 225 and 227 may be interposed between the cap plate 230 and the first and second electrode terminals 221 and 222 and may insulate the cap plate 230 from the first and second electrode terminals 221 and 222. Washers 224 for buffering a combining force may be disposed on the upper gaskets 225. The first and second electrode terminals 221 and 222 may be coupled to nuts 229. In an alternative implementation, the first and second electrode terminals 221 and 222 may have a rivet-type configuration.

First and second current collecting plates 251 and 261 may be respectively coupled to the first and second folding parts 211c and 212c of the electrode assembly 210 using, e.g., a welding method. The first and second current collecting plates 251 and 261 may be respectively electrically connected to the first and second electrode terminals 221 and 222 via first and second lead elements 252 and 262.

Insulating elements 226 may be disposed between the cap plate 230 and the first and second lead elements 252 and 262. The first and second lead elements 252 and 262 may respectively include first and second terminal lead elements 252a and 262a and first and second current collector lead elements 252b and 262b. The first and second terminal lead elements 252a and 262a may be coupled to and may electrically contact the first and second electrode terminals 221 and 222, respectively. The first and second current collector lead elements 252b and 262b may be coupled to and may electrically contact the first and second current collecting plates 251 and 261.

According to the present embodiment, performance of the secondary battery 200 may be improved by improving electrical contact between the first and second current collectors 250 and 260 and the respective first and second folding parts 211c and 212c of the electrode assembly 210.

Figure 7:
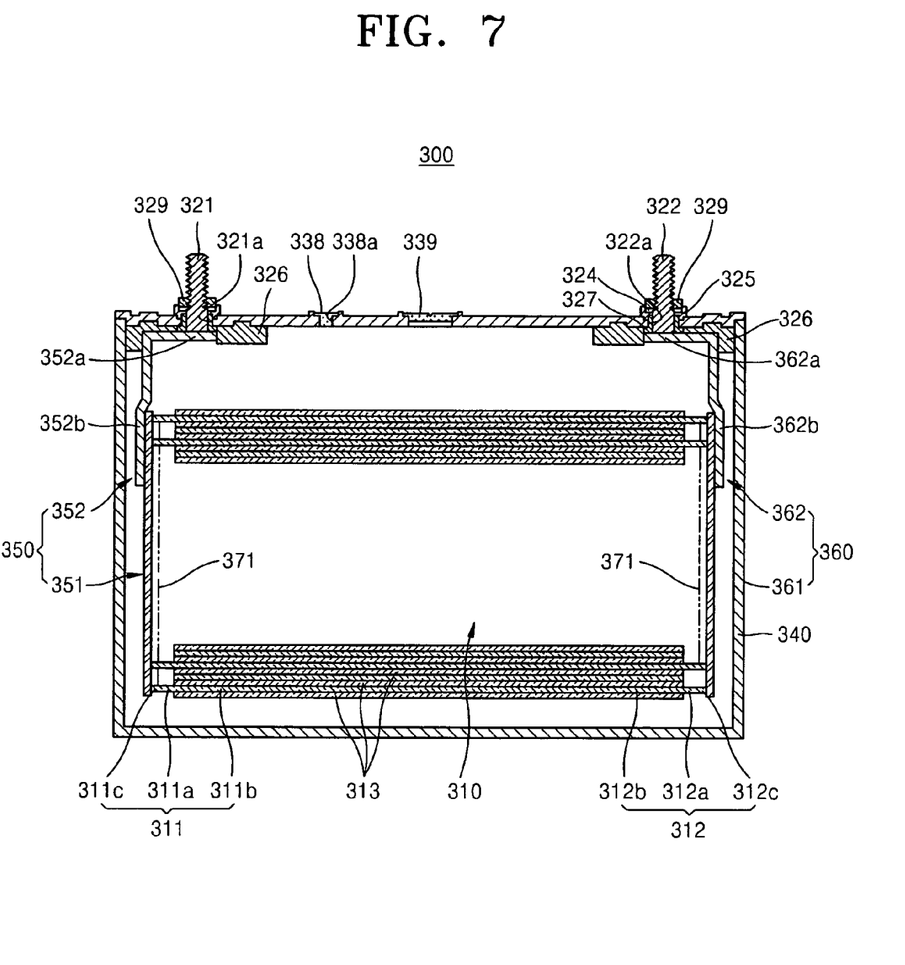
FIG. 7 illustrates a cross-sectional view of a secondary battery according to yet another embodiment.
Figure 8:
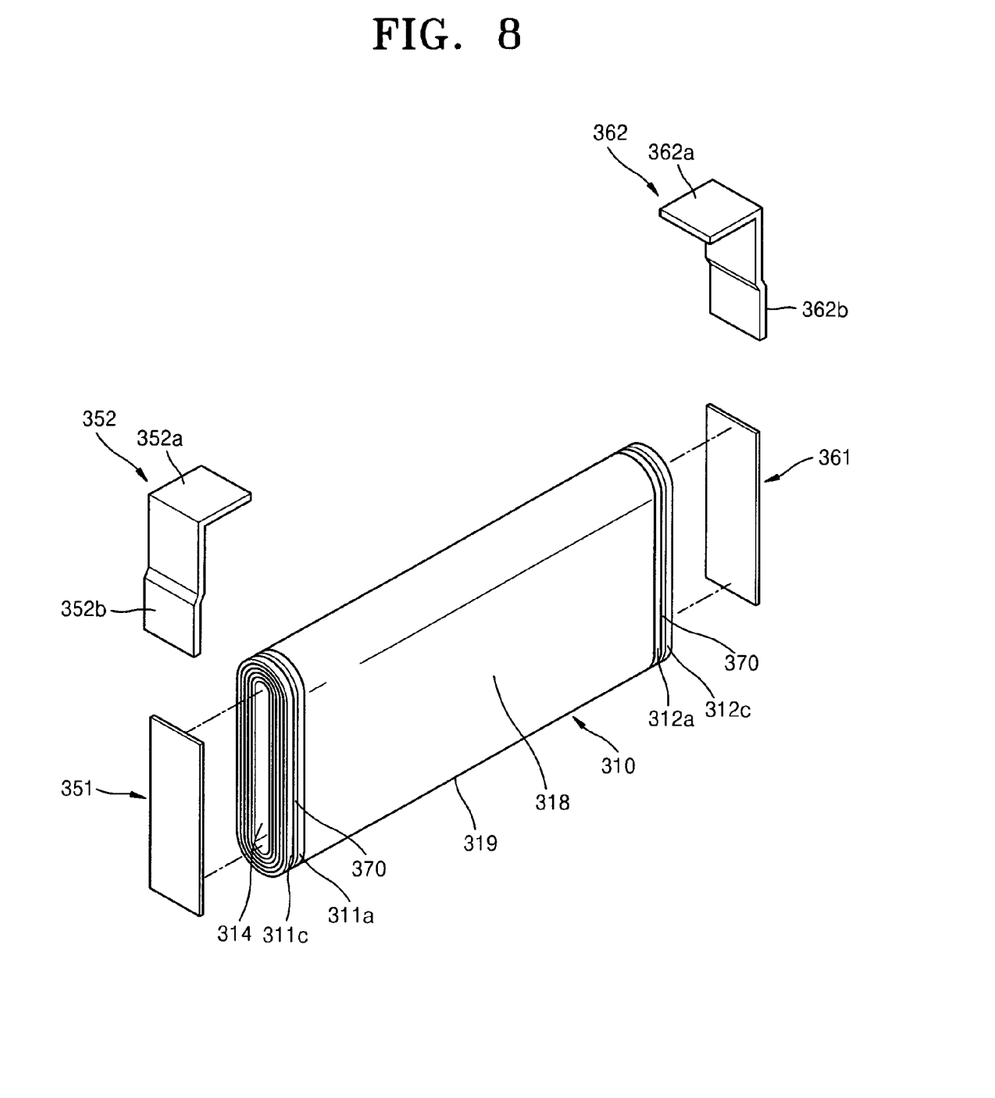
FIG. 8 illustrates a partially exploded perspective view of an electrode assembly and first and second current collectors in the secondary battery of FIG. 7.

FIG. 7 illustrates a cross-sectional view of a secondary battery 300 according to yet another embodiment. FIG. 8 illustrates a partially exploded perspective view of an electrode assembly 310 and first and second current collectors 350 and 360 of the secondary battery 300 of FIG. 7.

Compared to the secondary battery 100 illustrated in FIG. 2, in the secondary battery 300 of the present embodiment, first and second folding parts 311c and 312c may be formed by folding end portions of first and second uncoated parts 311a and 312a with respect to folding grooves 370.

Similar reference numerals are used to denote like elements in FIGS. 2 and 7 and repeated descriptions thereof will be omitted.

Referring to FIGS. 7 and 8, the secondary battery 300 may include an electrode assembly 310, first and second electrode terminals 321 and 322, a cap plate 330, a case 340, first and second current collectors 350 and 360, and the first and second folding parts 311c and 312c of the electrode assembly 310.

The electrode assembly 310 may include first and second electrode plates 311 and 312 respectively including first and second coated parts 311b and 312b and the first and second uncoated parts 311a and 312a. The first and second coated parts 311b and 312b may include a metallic current collector including an active material coated thereon. The first and second uncoated parts 311a and 312a may include a metallic current collector without the active material coated thereon. The electrode assembly 310 may further include a separator 313 interposed between the first and second electrode plates 311 and 312.

The first and second current collectors 350 and 360 may electrically contact the first and second folding parts 311c and 312c. The folding grooves 370 may be disposed in the first and second uncoated parts 311a and 312a so as to extend in one direction. The first and second folding parts 311c and 312c may be formed by folding ends of the first and second uncoated parts 311a and 312a with respect to the folding grooves 370. Thus, the first and second folding parts 311c and 312c may electrically contact the first and second current collectors 350 and 360, respectively.

The first and second folding parts 311c and 312c may be formed by folding portions of the first and second uncoated parts 311a and 312a with respect to virtual folding lines 371 extending along the folding grooves 370. The first and second folding parts 311c and 312c may electrically contact the first and second current collectors 350 and 360, respectively. The first and second folding parts 311c and 312c may increase an area of respective electrode plates 311 and 312 contacting the first and second current collectors 350 and 360.

Accordingly, due to the increased contact area, electrical contact between the first and second folding parts 311c and 312c of the electrode assembly 310 and the respective first and second current collectors 350 and 360 may be improved. Also, the first and second uncoated parts 311a and 312a of the electrode assembly 310 may be uniformly formed.

Figure 9:
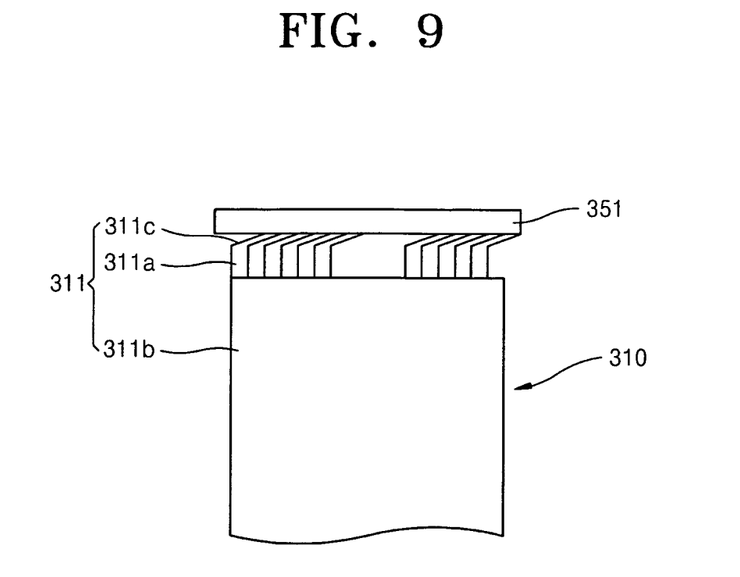
FIG. 9 illustrates a diagram showing a first folded part of an electrode assembly contacting a first current collecting plate in the secondary battery of FIG. 7.
Figure 10:
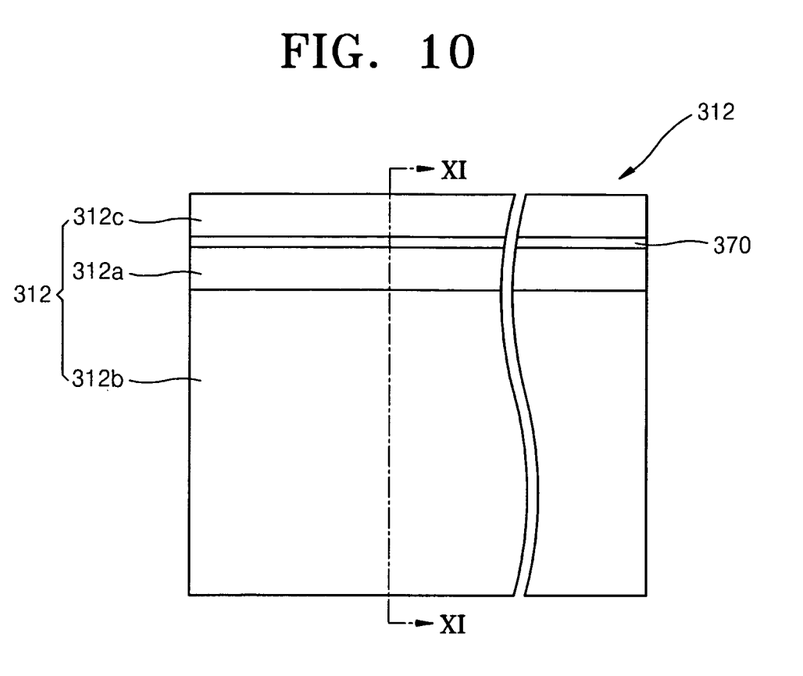
FIG. 10 illustrates a plan view of a folding groove formed in a second electrode plate of the secondary battery of FIG. 7.
Figure 11:
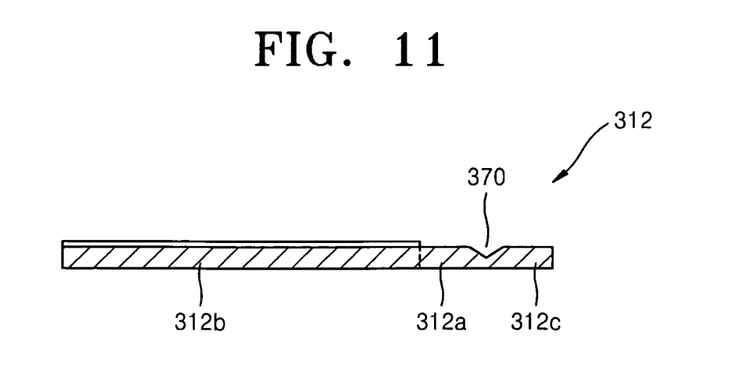
FIG. 11 illustrates a cross-sectional view taken along a line XI-XI of FIG. 10.

FIG. 9 illustrates a diagram showing the first uncoated part 311a of the electrode assembly 310 contacting a first current collecting plate 351 of the first current collector 350 in the secondary battery 300 of FIG. 7. FIG. 10 illustrates a plan view of the folding groove 370 in the second electrode plate 312 of the secondary battery 300 of FIG. 7. FIG. 11 illustrates a cross-sectional view taken along a line XI-XI of FIG. 10. The structure of FIGS. 10 and 11 may also be applied to the first electrode plate 311.

Referring to FIGS. 9, 10, and 11, the folding grooves 370 may be disposed in the first and second uncoated parts 311a and 312a of the first and second electrode plates 311 and 312 so as to continuously extend from one end to another end of each of the first and second electrode plates 311 and 312, respectively. Thus, after the first and second electrode plates 311 and 312 are wound, the first and second folding parts 311c and 312c may be easily folded with respect to the folding grooves 370. Also, since the first and second folding parts 311c and 312c may contact the first and second current collecting plates 351 and 361 in a folded state, contact areas therebetween may be increased and stable contact may be achieved.

Referring back to FIGS. 7 and 8, the electrode assembly 310 may be wound by interposing the separator 313, i.e., an insulator, between the first and second electrode plates 311 and 312. The case 340 may accommodate the electrode assembly 310. The first and second electrode terminals 321 and 322 may respectively be positive and negative electrode terminals; and the first and second electrode plates 311 and 312 may respectively be positive and negative electrode plates.

The first and second electrode terminals 321 and 322 may be respectively electrically connected to the first and second electrode plates 311 and 312 of the electrode assembly 310 and may protrude out of the case 340. The cap plate 330 may be coupled to an opening of the case 340. The first and second current collectors 350 and 360 may respectively be positive and negative electrode current collectors. The first and second current collectors 350 and 360 may respectively electrically contact the first and second electrode plates 311 and 312.

The first electrode plate 311 may include the first uncoated part 311a and the first coated part 311b. The second electrode plate 312 may include the second uncoated part 312a and the second coated part 312b. The first electrode terminal 321 may protrude out of the case 340 through a first terminal hole 321a. The second electrode terminal 322 may protrude out of the case 340 through a second terminal hole 322a.

An electrolyte inlet 338a may be disposed in the cap plate 330. A sealing cap 338 may be fitted in the electrolyte inlet 338a. A vent element 339 may be disposed in the cap plate 330. Upper and lower gaskets 325 and 327 may be interposed between the cap plate 330 and the first and second electrode terminals 321 and 322 and may insulate the cap plate 330 from the first and second electrode terminals 321 and 322.

Washers 324 for buffering a combining force may be disposed on the upper gaskets 325. The first and second electrode terminals 321 and 322 may be coupled to nuts 329. In an alternative implementation, the first and second electrode terminals 321 and 322 may have a rivet-type configuration.

First and second current collecting plates 351 and 361 may be respectively coupled to the first and second folding parts 311c and 312c of the electrode assembly 310 using, e.g., a welding method. The first and second current collecting plates 351 and 361 may be respectively electrically connected to the first and second electrode terminals 321 and 322 via first and second lead elements 352 and 362.

Insulating elements 326 may be disposed between the cap plate 330 and the first and second lead elements 352 and 362. The first and second lead elements 352 and 362 may respectively include first and second terminal lead elements 352a and 362a and first and second current collector lead elements 352b and 362b. The first and second terminal lead elements 352a and 362a may be coupled to and may electrically contact the first and second electrode terminals 321 and 322, respectively. The first and second current collector lead elements 352b and 362b may be coupled to and may electrically contact the first and second current collecting plates 351 and 361, respectively.

The first and second folding parts 311c and 312c may be formed by folding end portions of the first and second uncoated parts 311a and 312a with respect to the folding lines 371 formed by, i.e., defined by, the folding grooves 370. Accordingly, since the first and second folding parts 311c and 312c may contact the respective first and second current collecting plates 351 and 361 in a folded state, contact areas therebetween may be increased and stable contact may be achieved.

Although the folding groove 370 illustrated in FIG. 10 is disposed in a straight line, the embodiments are not limited thereto; and various configurations may be made in order to allow the first and second folding parts 311c and 312c to be easily folded. For example, instead of being disposed in a continuous straight line, the folding groove 370 may have, e.g., a form of a discontinuous dotted line (see FIG. 12) or a form of a discontinuous dashed line (see FIG. 13).

However, the embodiments are not even limited thereto; and the folding groove 370 may also have various other forms, e.g., a dashed dotted line, in addition to a continuous line, a dotted line, and a dashed line.

Figure 12:
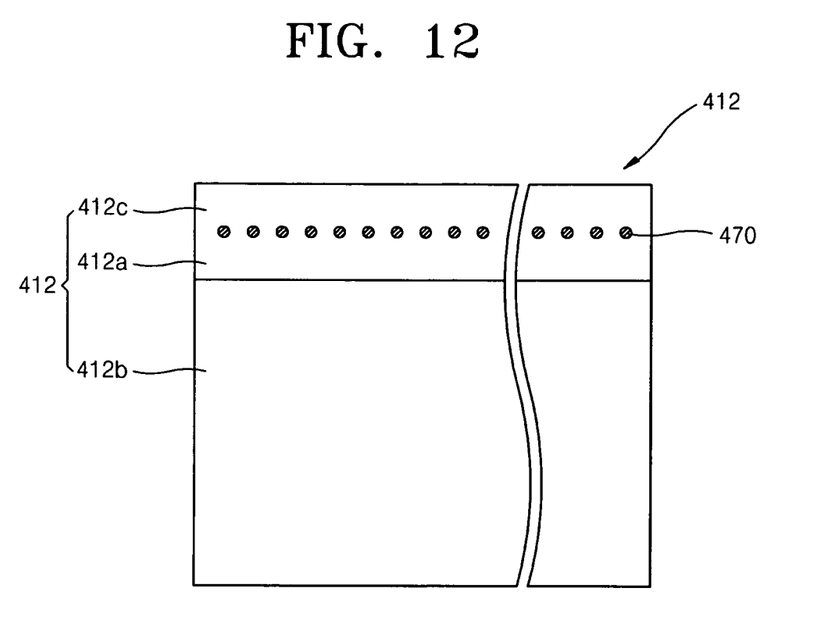
FIG. 12 illustrates a plan view of a dotted-line-type folding groove formed in a second electrode plate of a secondary battery according to still another embodiment.

FIG. 12 illustrates a plan view of a dotted-line-type folding groove 470 formed in a second electrode plate 412 of a secondary battery according to still another embodiment. Similar reference numerals are used to denote like elements in FIGS. 10 and 12 and repeated description thereof will be omitted.

Figure 13:
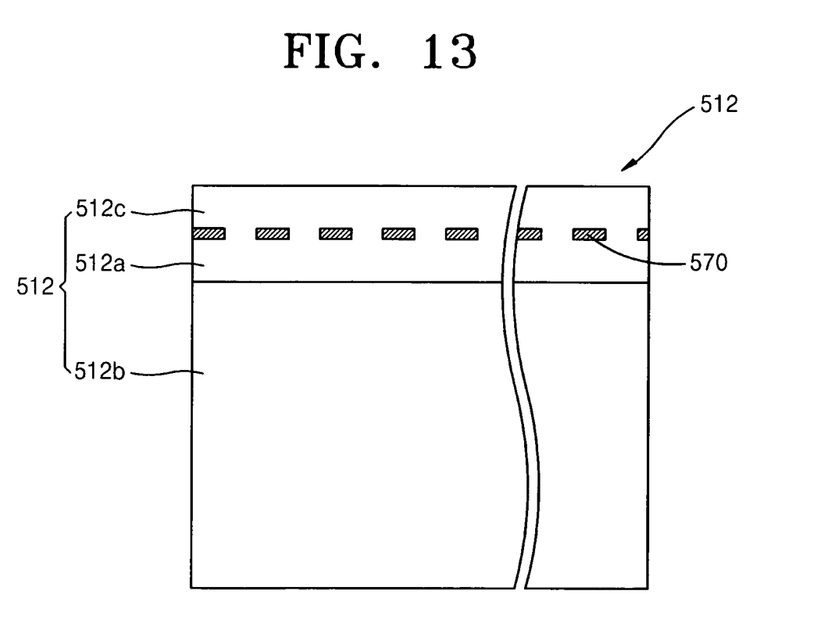
FIG. 13 illustrates a plan view of a dashed-line-type folding groove formed in a second electrode plate of a secondary battery according to still another embodiment.

FIG. 13 illustrates a plan view of a dashed-line-type folding groove 570 formed in a second electrode plate 512 of a secondary battery according to still another embodiment. Similar reference numerals are used to denote like elements in FIGS. 10 and 13 and repeated description thereof is omitted.

Figure 14:
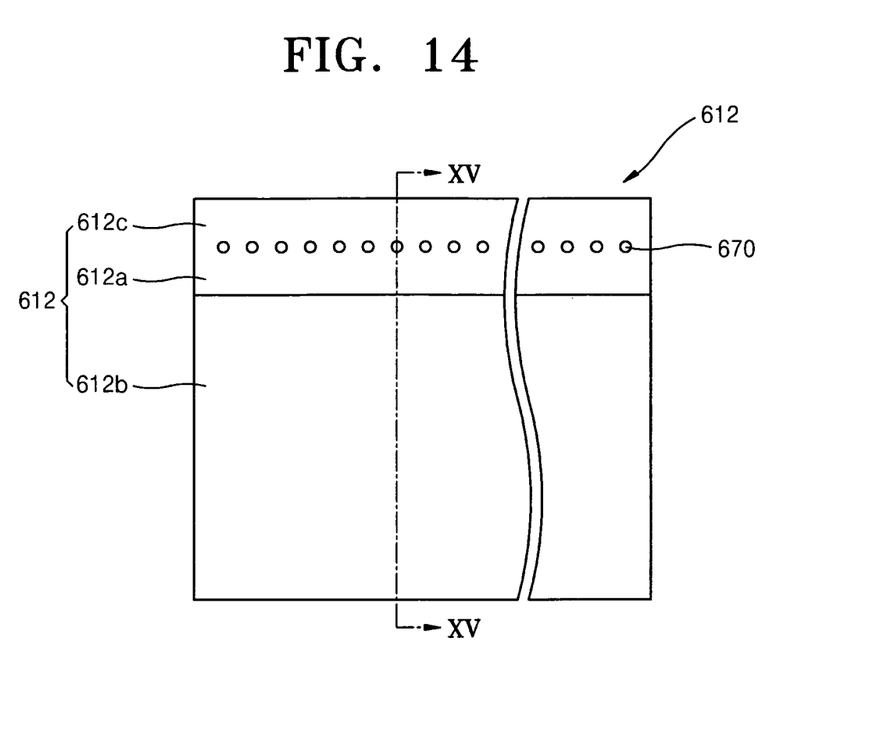
FIG. 14 illustrates a plan view of folding holes formed in a second electrode plate of a secondary battery according to still another embodiment.
Figure 15:
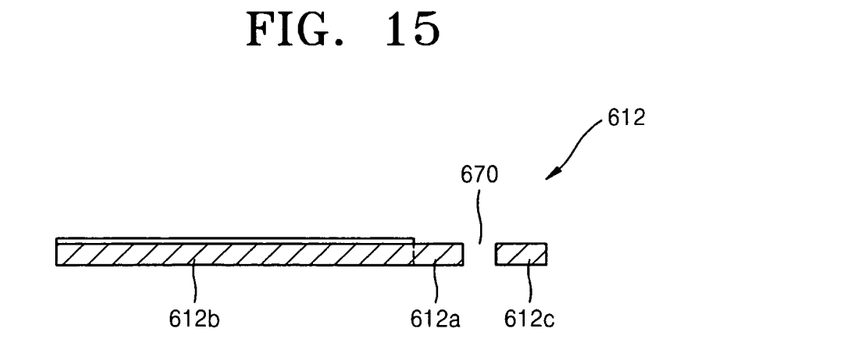
FIG. 15 illustrates a cross-sectional view taken along a line XV-XV of FIG. 14.

Although the folding grooves 370, 470, and 570 as illustrated in FIGS. 10, 12, and 13 do not penetrate second electrode plates 312, 412, and 512, in an alternative implementation, instead of the folding grooves 370, 470, and 570, folding holes penetrating the second electrode plate may be used (see FIGS. 14 and 15). In comparison to the folding grooves 370, 470, and 570, the folding holes that penetrate the second electrode plate may allow a folding part to be folded more easily.

FIG. 14 illustrates a plan view of folding holes 670 in a second electrode plate 612 of a secondary battery according to still another embodiment. FIG. 15 illustrates a cross-sectional view taken along a line XV-XV of FIG. 14.

Similar reference numerals are used to denote like elements in FIGS. 10 and 14 and repeated descriptions thereof will be omitted.

Referring to FIGS. 14 and 15, the folding holes 670 may penetrate a second uncoated part 612a of the second electrode plate 612 and may extend from one end to another end of the second electrode plate 612 in the form of, e.g., a dotted line or a dashed line. In this case, additional supporting bars may not be inserted into the folding holes 670.

As described above, according to the embodiments, performance of a secondary battery may be improved by improving electrical contact between current collectors and uncoated parts of an electrode assembly.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
    an electrode assembly, the electrode assembly including
        electrode plates and
        a separator interposed between the electrode plates,
    at least one of the electrode plates including:
        a coated part, the coated part including a metallic plate having an active material coated thereon, and
        an uncoated part, the uncoated part including a metallic plate without active material coated thereon,
            the uncoated part including
                a folding part at an end portion of the uncoated part, the folding part being folded with respect to other portions of the uncoated part along a folding line such that a plane of the metallic plate in the folding part is inclined with respect to a plane of the metallic plate in other portions of the uncoated part;
            a current collector physically and electrically contacting the folding part; and
            a supporting element, the supporting element penetrating the uncoated part along the folding line, and supporting the folding part along the folding line,
    wherein the electrode assembly has a plate shape formed by winding the electrode plates and the separator in a jelly roll configuration and then pressing the wound electrode assembly,
    wherein the electrode assembly includes:
        a flat part where an outer circumference of the electrode assembly is flat; and
        curved parts where the outer circumference of the electrode assembly is curved, the curved parts being disposed at both ends of the flat part, and
    wherein the folding line is disposed in the flat part,
    wherein a penetration slit penetrates the uncoated part along the folding line.

2. The secondary battery as claimed in claim 1, wherein the supporting element includes a supporting plate, the supporting plate: being disposed in the penetration slit, and supporting the folding part along the folding line.

3. The secondary battery as claimed in claim 1, further comprising:
    a case, the case:
    having an open end, and
    being configured to accommodate the electrode assembly; and
    a cap plate, the cap plate:
    being coupled to the open end of the case, and
    being configured to seal the electrode assembly in the case.

4. The secondary battery as claimed in claim 1, wherein:
    the electrode plates include first and second electrode plates separated by the separator, and
    the current collector includes first and second current collectors electrically connected to the first and second electrode plates, respectively.

5. The secondary battery as claimed in claim 4, further comprising a first electrode terminal, the first electrode terminal:
    being electrically connected to the first current collector, and
    partially protruding out of the case through the cap plate.

6. The secondary battery as claimed in claim 5, further comprising a second electrode terminal, the second electrode terminal:
    being electrically connected to the second current collector, and
    partially protruding out of the case through the cap plate.

7. The secondary battery as claimed in claim 1, wherein the supporting element that penetrates the uncoated part along the folding line extends in one direction in the form of a straight continuous line, a discontinuous dotted line, or a discontinuous dashed line.

* * * * *